(12) United States Patent
Alexander et al.

(10) Patent No.: US 11,449,875 B1
(45) Date of Patent: Sep. 20, 2022

(54) ORGANIZATIONAL AND PERSONAL IDENTITY VERIFICATION AND VALIDATION

(71) Applicant: Wells Fargo Bank, N.A., San Francisco, CA (US)

(72) Inventors: Ryan S. Alexander, Mill Creek, WA (US); Kristine Ing Kushner, Orinda, CA (US); Katherine Guse Jagoe, Danville, CA (US); Steven E. Puffer, Champlin, MN (US); Eric E. Thompson, San Francisco, CA (US); Paul Vittimberga, Oakland, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 363 days.

(21) Appl. No.: 15/870,514

(22) Filed: Jan. 12, 2018

(51) Int. Cl.
```
G06Q 30/00      (2012.01)
G06Q 30/02      (2012.01)
G06F 17/18      (2006.01)
G06F 3/048      (2013.01)
G06F 16/29      (2019.01)
```
(52) U.S. Cl.
CPC .......... *G06Q 30/018* (2013.01); *G06F 3/048* (2013.01); *G06F 16/29* (2019.01); *G06F 17/18* (2013.01); *G06Q 30/0282* (2013.01)

(58) Field of Classification Search
CPC .. G06Q 30/018; G06Q 30/0282; G06F 3/048; G06F 17/18
See application file for complete search history.

(56) References Cited

U.S. PATENT DOCUMENTS

| | | |
|---|---|---|
| 7,412,446 B2 | 8/2008 | Shah |
| 7,506,001 B2 | 3/2009 | Johnson et al. |
| 7,769,649 B1 | 8/2010 | Eliscu |

(Continued)

OTHER PUBLICATIONS

"Annual report" Wikipedia, as archived Jan. 30, 2017, available at: https://web.archive.org/web/20170130001127/https://en.wikipedia.org/wiki/Annual_report (Year: 2017).*

(Continued)

*Primary Examiner* — Andrew B Whitaker
*Assistant Examiner* — Brendan S O'Shea
(74) *Attorney, Agent, or Firm* — Foley & Lardner LLP (57) ABSTRACT

Systems, methods, and apparatuses are described for an intelligent dashboard that allows interested parties to verify and validate relevant information on enterprises and their representatives. A servicing entity may provide an enterprise with a dashboard that includes select fields corresponding to information predicted to be useful to clients of the enterprise based on commercial characteristics of the enterprise and its client base. Fields may be populated with information previously available to the servicing entity, and with supplemental information acquired (manually or automatically) from the enterprise or from third party data sources. The enterprise may impose restrictions on which information is to be available to which clients, and the servicing entity may generate a code for use by clients to access the dashboard or certain information. The dashboard can allow clients to track the location of a representative and help validate the identify of a representative arriving at a client's location.

19 Claims, 3 Drawing Sheets

(56) References Cited

U.S. PATENT DOCUMENTS

| | | | |
|---|---|---|---|
| 8,234,222 B2 | 7/2012 | Thompson et al. | |
| 8,311,863 B1 | 11/2012 | Kemp | |
| 8,639,616 B1 | 1/2014 | Rolenaitis et al. | |
| 8,788,655 B2 | 7/2014 | Dare et al. | |
| 2001/0027525 A1* | 10/2001 | Gamlin | A47G 29/141 |
| | | | 726/27 |
| 2001/0032092 A1 | 10/2001 | Calver | |
| 2007/0271339 A1* | 11/2007 | Katz | G06Q 10/10 |
| | | | 709/204 |
| 2008/0010198 A1 | 1/2008 | Eliscu | |
| 2009/0012856 A1 | 1/2009 | Sweeney | |
| 2013/0179244 A1 | 7/2013 | Laffoon et al. | |
| 2013/0179988 A1 | 7/2013 | Bekker et al. | |
| 2013/0214898 A1* | 8/2013 | Pineau | H04L 63/101 |
| | | | 340/5.6 |
| 2014/0019294 A1 | 1/2014 | Hill | |
| 2014/0044250 A1* | 2/2014 | Gartner | H04M 3/00 |
| | | | 379/265.09 |
| 2014/0122306 A1* | 5/2014 | Fox | G06Q 40/025 |
| | | | 705/30 |
| 2014/0337188 A1 | 11/2014 | Bennett et al. | |
| 2015/0220942 A1 | 8/2015 | Dubberley | |
| 2015/0269586 A1 | 9/2015 | Garia et al. | |
| 2016/0027125 A1* | 1/2016 | Bryce | G06Q 40/12 |
| | | | 705/30 |
| 2016/0035009 A1* | 2/2016 | Khrawish | G06Q 30/0259 |
| | | | 705/7.15 |
| 2016/0132960 A1 | 5/2016 | Roberts et al. | |
| 2016/0307380 A1* | 10/2016 | Ho | H04L 65/1069 |
| 2017/0169422 A1* | 6/2017 | Ye | G06Q 20/3276 |
| 2017/0200238 A1 | 7/2017 | Burdette et al. | |

OTHER PUBLICATIONS

"Financial statement" Wikipedia, as archived Dec. 13, 2017, available at: https://web.archive.org/web/20171213043126/https://en.wikipedia.org/wiki/Financial_statement (Year: 2017).*

AllBusiness.com "Five Things Prospective Investors Are Looking for in Your Business Plan" New York Times, May 12, 2009; available at: https://archive.nytimes.com/www.nytimes.com/allbusiness/AB12322189_primary.html?ref=smallbusiness (Year: 2009).*

Collins, Carlton "11 QuickBooks tips for producing stellar reports" Journal of Accountancy, Oct. 1, 2014; available at:https://www.journalofaccountancy.com/issues/2014/oct/quickbooks-reporting-tips.html (Year: 2014).*

* cited by examiner

ORGANIZATIONAL AND PERSONAL IDENTITY VERIFICATION AND VALIDATION

TECHNICAL FIELD

Embodiments of the present disclosure relate generally to a portal that allows clients to verify and validate information on enterprises and their representatives.

BACKGROUND

Consumers and investors considering whether they want to purchase goods or services from, invest in, or otherwise engage with, a company are often lacking key information about the company. Even if a potential customer is able to determine a company is legally registered, or even if the customer has dealt with a company in the past, he or she may not have enough information regarding whether the company remains a going concern (i.e., still exists), how long ago the company began operating, how many employees the company has, all the goods and services provided by the company, operating hours, existence of brick and mortar locations, what forms of payment are accepted, etc. Similarly, a prospective investor may learn of a startup company or other enterprise, but may not know about its assets, financial health, lifecycle stage, how leveraged the startup is, other investment it has secured, the background and experiences of its leadership, etc.

Some information on companies can often be found on the internet, but sometimes companies, especially smaller and/or newer ones, do not have a significant online presence, if any. Even if a company has a website (or webpages hosted by another entity, such as a Facebook page), the information in such websites/webpages is typically self-reported, and not from other entities with firsthand knowledge about the company. Self-reported information on company websites may be more focused on marketing than on providing the specific information sought by potential customers and investors. Moreover, information on the internet may not be current, as a company may expand, shrink, close, etc., without having its online presence updated in a timely manner, if ever, to reflect such changes. Additionally, a website/webpage may mask the actual characteristics and financial health of a company, or otherwise mislead (intentionally or unintentionally) a potential customer or investor about the company. For example, a small company that may not be on solid footing may have a relatively sophisticated-looking website that makes the small company appear more solid than it is. This may draw customers and investors to the company when they would have selected other options had they had a better picture of the company. Conversely, a lack of a sophisticated website may mean only that a successful company, which may offer quality goods and services and may have very capable employees, has not dedicated as many resources to its online presence. This may turn away some potential customers and prospective investors who may be drawn to a company with a more robust online presence.

Some third-party websites appear or claim to offer useful information about companies to help potential customers make more informed decisions. However, such third-party websites suffer from several shortcomings. For example, a website with information about another company may be providing no more than a directory by aggregating names and addresses of companies from one or more sources (such as government records and phone books) and presenting the information together on one website. Such unverified lists of companies, which may or may not still exist, are often not very useful to prospective customers and investors wanting to learn more details about particular companies.

Other third-party websites allow users to rate and review the goods/services of a company, and share such ratings and reviews with others to ostensibly help them better evaluate companies for themselves. However, the ratings and reviews of some customers may be based on criteria that differ significantly from what matters to other customers, making the ratings and reviews have little or no relevance for those other customers. For example, a reviewer may rate an experience poorly because of a delay in receiving services, or an unsatisfactory encounter with a member of the staff, even though the services received were of high quality; such a rating may not be as useful for a potential customer who is more concerned with the quality of the services rather than the timeliness of its delivery. As another example, a diner may rate a sushi restaurant relatively poorly because of a lack of variety in types of seafood served even though the seafood that is available is very fresh, whereas another diner might care more about the freshness of the seafood that is served over having a great variety of seafood. Also, such reviews may be biased, such as reviews submitted by competitors or others wishing to turn potential customers away, or reviews submitted by employees and others wishing to attract more customers.

Companies may lose out on opportunities if potential customers and investors do not have access to reliable information that goes beyond word of mouth and marketing materials, and that is adapted to the particular needs of the customers and investors of particular companies and in particular industries.

What is needed are systems and methods that address one or more of the above, as well as other, shortcomings.

SUMMARY

Various example embodiments relate to systems, methods, and apparatuses that allow interested parties to verify and validate certain information. In example embodiments, a method may comprise acquiring, by a servicing entity computing system of a servicing entity, and from an enterprise computing system of an enterprise, a first dataset with information on the enterprise. A dashboard template with a set of fields corresponding to information related to the enterprise may be generated. The set of fields may be automatically selected based on the first dataset. One or more of the fields in the set of fields may be populated using data in the first dataset. A set of selections of the enterprise may be received from the enterprise computing system, the selections identifying which fields in the set of fields are to be made available to which clients of the enterprise. The set of selections may identity all or fewer than all of the fields in the set of fields, and the set of selections may identify all clients of the enterprise or fewer than all clients of the enterprise. A dashboard with the selected fields as populated using data in the first dataset may be generated. The generated dashboard may be provided to a client computing system of a client of the enterprise, where the client is identified in the set of selections of the enterprise, and where the dashboard includes fields selected by the enterprise to be available to the client.

In other example embodiments, a method may comprise receiving, from an enterprise computing system of an enterprise, a request to enroll in a dashboard service. A dashboard template with a set of fields corresponding to information related to the enterprise may be generated. The set of fields may be selected based on data in a first dataset with information on the enterprise. The data in the first dataset may have been acquired by a servicing entity before the request to enroll in the dashboard service was received. A second dataset with data that is not contained in the first dataset may be acquired from the enterprise computing system. Fields in the set of fields may be populated using data in the first dataset and in the second dataset. A set of selections of the enterprise may be accepted, the selections identifying which fields in the set of fields are to be made available to which clients of the enterprise. The set of selections may identity all or fewer than all of the fields in the set of fields, and the set of selections may identify all clients of the enterprise or fewer than all clients of the enterprise. A dashboard with the selected fields as populated using data in the first dataset and in the second dataset may be generated. The generated dashboard may be provided to a first client computing system of a first client of the enterprise, where the first client is identified in the set of selections of the enterprise, and where the dashboard includes fields selected by the enterprise to be available to the first client. One or fields in the dashboard may be updated using data received by the servicing entity computing system from the enterprise computing system of the enterprise, the first client computing system of the first client, and/or a second client computing system of a second client, where the second client is identified in the set of selections of the enterprise. An updated dashboard with the one or more fields updated may be provided to the first client computing system of the first client, to the second client computing system of the second client, where the updated dashboard includes fields selected by the enterprise to be available to the second client, and/or a to third client computing system of a third client, where the third client is identified in the set of selections of the enterprise, and where the updated dashboard includes fields selected by the enterprise to be available to the third client.

Embodiments of the present disclosure relate to intelligent dashboards that can provide, via a servicing entity, portals for information that is of particular interest to clients of an enterprise. The servicing entity may already have certain information on the enterprise as a result of past dealings, such as a financial institution that provides services to the enterprise. The information may be custom-tailored, current, and may receive greater scrutiny because of the source of the information (e.g., a trusted financial institution) and because of the process of establishing the dashboard. Clients may be able to use dashboards to learn about and track the activities of enterprises and/or representatives of the enterprises, even in real time, including tracking physical location of representatives and validating identities. These and other features and benefits, together with the organization and manner of operation thereof, will become apparent from the following detailed description when taken in conjunction with the accompanying drawings.

DETAILED DESCRIPTION

The present disclosure relates to systems, methods, and apparatuses for allowing clients (such as prospective customers and investors) to verify and validate information on enterprises and their representatives. In example embodiments, a servicing entity offers a dashboard that provides clients of the enterprise with information that is believed to be of interest based on commercial characteristics of an enterprise (e.g., line of business, enterprise's industry, habits of customers, etc.). Because the enterprise may have engaged in a business relationship with the servicing entity, some information on the enterprise may already be available to the servicing entity. Information may also be acquired from the enterprise via, for example, responses to certain queries or via software installed on machines of key representatives of the enterprise. Dashboards may be populated with information previously known to, or subsequently acquired by, the servicing entity. The enterprise may place restrictions on what information is made available to which clients to protect confidential information. The servicing entity may provide recommendations on what information should be provided (and to which types of clients) based on commercial characteristics of the enterprise and/or on what other similar enterprises with dashboards have done. The dashboard is able to provide clients with information that has received a relatively greater level of scrutiny than other information available online. Clients may also obtain information on the location of representatives of the enterprise, and verify the identity of a representative (such as a service provider) who may be approaching the client. Dashboards may be modified to add or remove fields, or to update information in fields, as new information becomes available to the servicing entity (via, e.g., the enterprise, its representatives, its clients, etc.).

As used herein, the term "enterprise" is used to refer collectively to any public or private organization or legal entity that provides goods, services, and/or information and is not necessarily limited only to businesses and other commercial entities. Examples include nonprofit and for-profit corporations, limited liability companies, partnerships, co-operatives, and sole proprietorships. The term "client" is used to collectively refer to any interested person or persons, organization, or legal entity that may (currently or in the future) receive goods, services, and/or information from, or invest in, an enterprise, or that may have received goods, services, and/or information from, or invested in, the enterprise in the past. The term "representative" is used to collectively refer to any entities who act on behalf, or otherwise advance the interests, of the enterprise, and may include employees, contractors, agents, and personnel at all levels in the enterprise.

Figure 1:
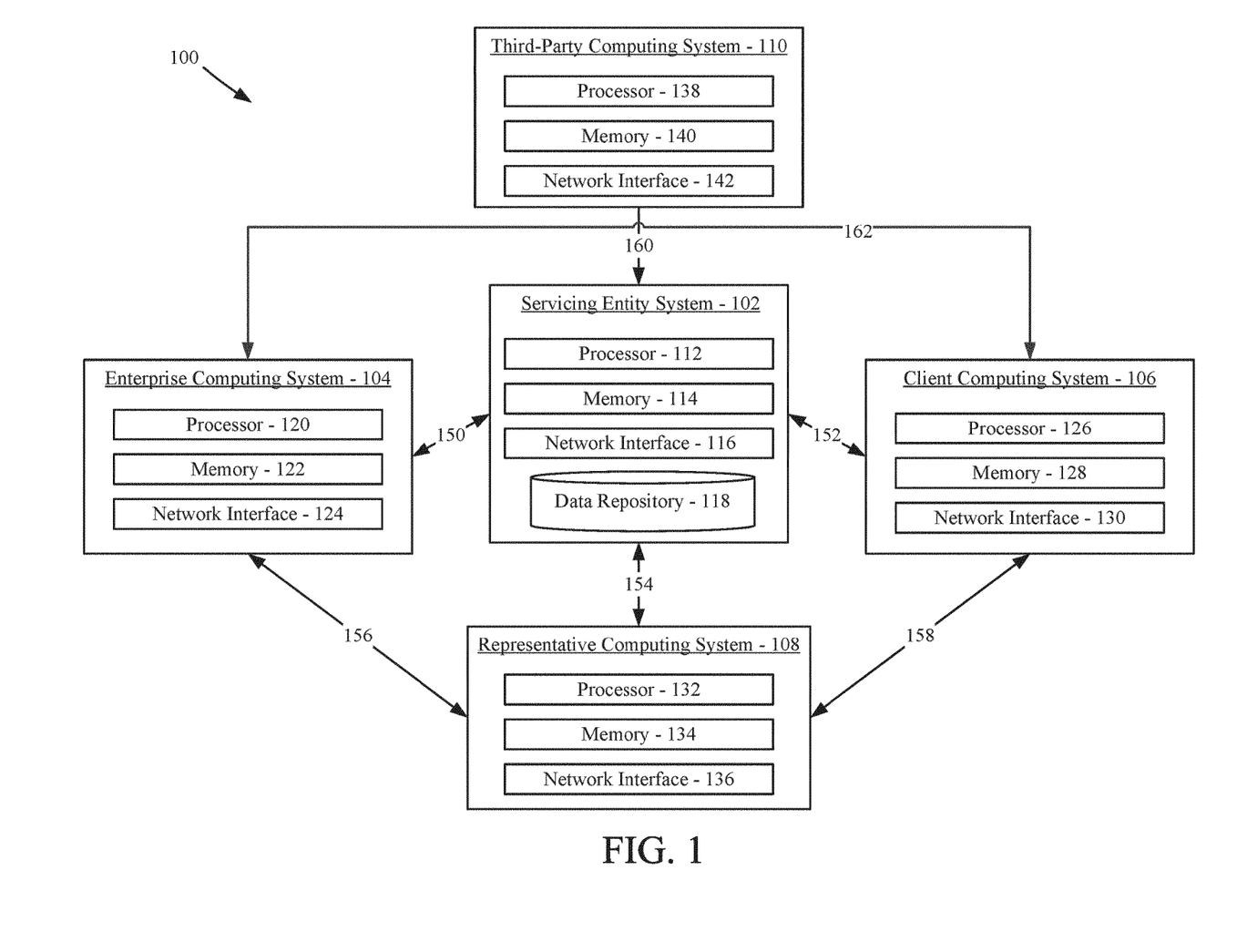
FIG. 1 is a diagram of an example computing system according to one or more embodiments.

Referring to FIG. 1, a block diagram of a computing system 100 is shown according to one or more example embodiments. As described herein, the computing system 100 enables verified and validated information via intelligent dashboards. The computing system 100 includes a servicing entity system 102 in communication with a plurality of computing systems 104, 106, 108, 110. Each computing system 102, 104, 106, 108, 110 may include, for example, one or more mobile computing devices (such as smartphones, tablets, laptops, etc.), non-mobile computing devices (such as desktop computers, workstations, servers, etc.), or a combination thereof. As further discussed below, computing systems 102, 104, 106, 108, 110 are communicably coupled to each other over a network, which may be any type of type of network. For example, the network may include wireless network interfaces (e.g., 802.11X, ZigBee, Bluetooth, Internet, etc.), wired network interfaces (e.g., Ethernet, USB, Thunderbolt, etc.), or any combination thereof to enable network connections between systems. Such network connections are not limited to particular equipment, or to particular communication sessions, such that the same network interface must be used, or the communication should remain uninterrupted, for an information exchange to be considered a network connection. Rather, as used here, network connections refer to communications between two systems using any devices and during any number of sessions separated in time. The network is structured to permit the exchange of data, values, instructions, messages, and the like between the computing systems 102, 104, 106, 108, 110 via such network connections.

Computing system 104 includes a processor 120, a memory 122, and a network interface 124. The processor 120 may be implemented as a general-purpose processor, an application specific integrated circuit (ASIC), one or more field programmable gate arrays (FPGAs), a digital signal processor (DSP), a group of processing components, or other suitable electronic processing components structured to control the operation of the computing system 104. The memory 122 (e.g., RAM, ROM, NVRAM, Flash Memory, hard disk storage, etc.) may store data and/or computer code for facilitating at least some of the various processes described herein. In this regard, the memory 122 may store programming logic that, when executed by the processor 120, controls the operation of the computing system 104. The network interface 124 may be structured to allow the computing system 104 to communicate data to and from other devices (such as computing system 102 via network connection 150, computing system 108 via network connection 156, and/or computing system 106 via network connection 162) either directly or indirectly. The computing system 104 may be, for example, an enterprise computing system (with one or more computing devices) of an enterprise, and may provide a web browser (such as Google Chrome, Microsoft Edge, Internet Explorer, or other application for accessing information via the internet or other network) or other application (such as a native application for a mobile device that could be provided or authorized by the institution implementing servicing entity system 102) to facilitate communication with other devices in system 100.

Computing system 106 includes a processor 126, a memory 128, and a network interface 130. The processor 126 may be implemented as a general-purpose processor, an ASIC, one or more FPGAs, a DSP, a group of processing components, or other suitable electronic processing components structured to control the operation of the computing system 104. The memory 128 (e.g., RAM, ROM, NVRAM, Flash Memory, hard disk storage, etc.) may store data and/or computer code for facilitating at least some of the various processes described herein. In this regard, the memory 128 may store programming logic that, when executed by the processor 126, controls the operation of the computing system 106. The network interface 130 may be structured to allow the computing system 104 to communicate data to and from other systems (such as servicing entity system 102 via network connection 152, computing system 108 via network connection 158, and/or computing system 104 via network connection 162) either directly or indirectly. The computing system 106 may be a client computing system (with one or more computing devices) of a customer, investor, or other client of the enterprise associated with the enterprise computing system 104, and may provide a web browser (such as Google Chrome, Microsoft Edge, Internet Explorer, or other application for accessing information via the internet or other network) or other application (such as a native application for a mobile device that could be provided or authorized by the institution implementing servicing entity system 102) to facilitate communication with other devices in system 100.

Computing system 108 includes a processor 132, a memory 134, and a network interface 136. The processor 132 may be implemented as a general-purpose processor, an ASIC, one or more FPGAs, a DSP, a group of processing components, or other suitable electronic processing components structured to control the operation of the computing system 108. The memory 134 (e.g., RAM, ROM, NVRAM, Flash Memory, hard disk storage, etc.) may store data and/or computer code for facilitating at least some of the various processes described herein. In this regard, the memory 134 may store programming logic that, when executed by the processor 132, controls the operation of the computing system 108. The network interface 136 may be structured to allow the computing system 108 to communicate data to and from other systems (such as servicing entity system 102 via network connection 154, computing system 104 via network connection 156, and/or computing system 106 via network connection 158) either directly or indirectly. The computing system 108 may be a representative computing system (with one or more computing devices) of a representative of the enterprise associated with computing system 104, as further discussed below, that includes a web browser (such as Google Chrome, Microsoft Edge, Internet Explorer, or other application for accessing information via the internet or other network) or other application (such as a native application for a mobile device that could be provided or authorized by the institution implementing servicing entity system 102) to facilitate communication with other devices in system 100.

Computing system 110 includes a processor 138, a memory 140, and a network interface 142. The processor 138 may be implemented as a general-purpose processor, an ASIC, one or more FPGAs, a DSP, a group of processing components, or other suitable electronic processing components structured to control the operation of the computing system 110. The memory 140 (e.g., RAM, ROM, NVRAM, Flash Memory, hard disk storage, etc.) may store data and/or computer code for facilitating at least some of the various processes described herein. In this regard, the memory 140 may store programming logic that, when executed by the processor 138, controls the operation of the computing system 110. The network interface 142 may be structured to allow the computing system 110 to communicate data to and from other systems (such as servicing entity system 102 via network connection 160) either directly or indirectly. The computing system 110 may be any third-party computing system (with one or more computing devices), and may that include, for example, web hosting software or other application for providing access to information (e.g., to servicing entity system 102) via the internet or other network. The information accessed may include, for example, information on a type of business, goods and services offered, consumer behaviors, industry trends, public relations data and press releases, etc., which may characterize the commercial activities of the enterprise.

Computing system 102 includes a processor 112, a memory 114, and a network interface 116. The processor 112 may be implemented as a general-purpose processor, an ASIC, one or more FPGAs, a DSP, a group of processing components, or other suitable electronic processing components structured to control the operation of the computing system 102. The memory 114 (e.g., RAM, ROM, NVRAM, Flash Memory, hard disk storage, etc.) may store data and/or computer code for facilitating at least some of the various processes described herein. In this regard, the memory 114 may store programming logic that, when executed by the processor 112, controls the operation of the computing system 102. The network interface 116 may be structured to allow the computing system 102 to communicate data to and from other systems (such as computing system 104 via network connection 150, computing system 106 via network connection 152, computing system 108 via network connection 154, and/or computing system 110 via network connection 160) either directly or indirectly. The computing system 100 may be arranged, for example, such that the servicing entity system 102 operates as a server, and computing systems 104, 106, and 108 operate as clients, and that computing system 110 operates as a server and servicing entity system 102 operates as a client. The servicing entity system 102 may include a security and login client which may provide fraud prevention measures and security protections (such as authentication of user identities).

The servicing entity system 102 also includes a data repository 118 that can store information obtained via one or more of the computing systems 104, 106, 108, 110, or that was received previously through other means (e.g., as a result of previous dealings with enterprise representatives). The data repository can be, for example, one or more databases with structured data, unstructured data, or a combination of structured and unstructured data. The data in the data repository 118 could be arranged to be accessible via computing systems 104, 106, 108 with proper authentication. In certain versions, some or all of the data may be stored on separate local or remote computing devices that are accessible to, or via, the servicing entity system 102. The data repository 118 may also include data received from other computing systems and devices, such as the enterprise computing system 104, the third-party computing system 110, and the client computing system 106. For example, if the servicing entity system 102 is administered by (or on behalf of) a financial institution, the data repository 118 may include client information from financial accounts that may be stored on one or more separate systems that could be co-located with, or remote to, the servicing entity system 102.

Figure 2:
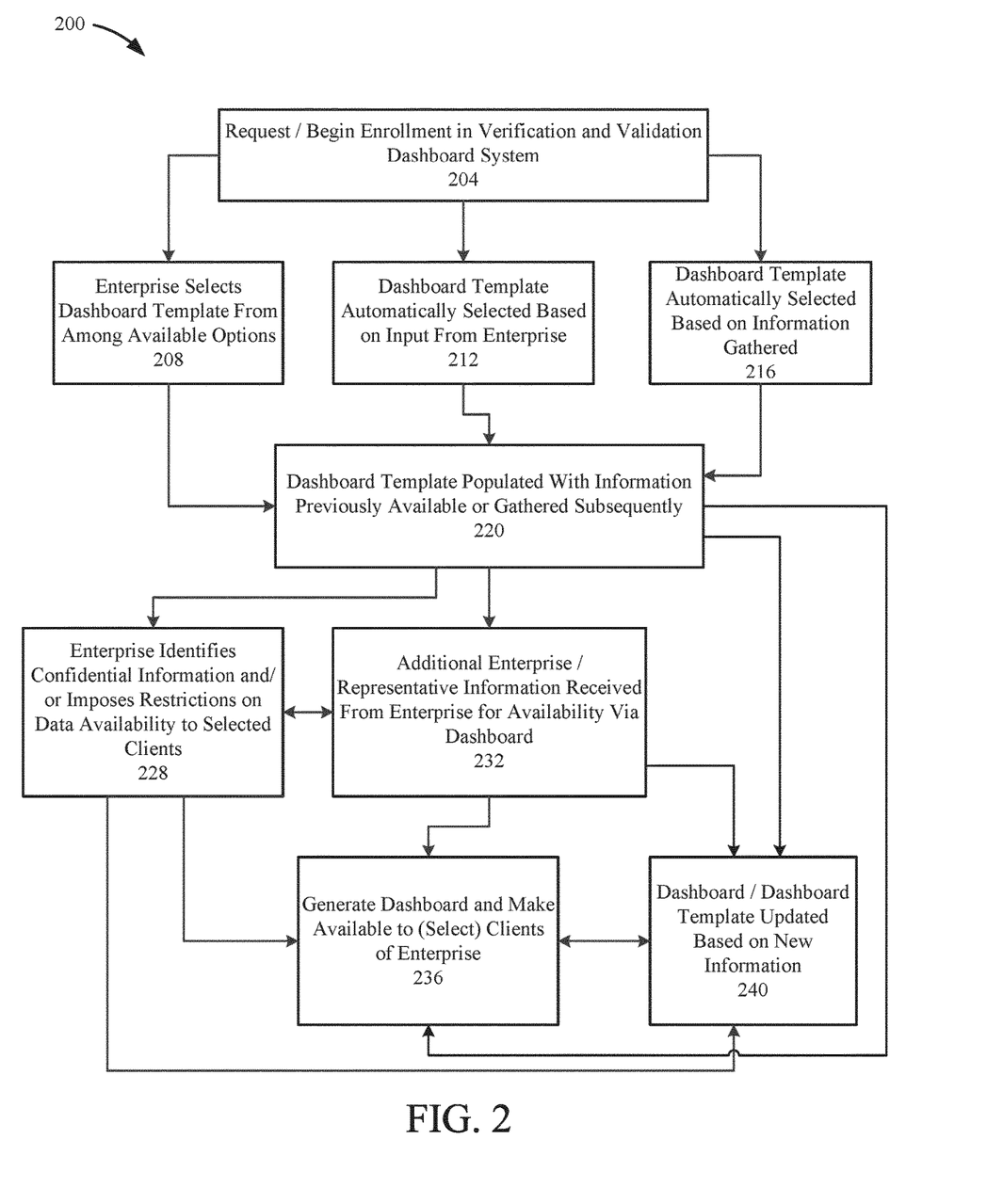
FIG. 2 is flow diagram of an example dashboard generation method according to one or more embodiments.

Referring to FIG. 2, an example method 200 for initiating an identity verification and validation service is described according to various embodiments. The method 200 may be implemented using servicing entity system 102. At 204, an enterprise (via a representative or other entity authorized by the enterprise, and/or via computing systems if implemented an automated fashion) may use enterprise computing system 104 to connect with servicing entity system 102 of a servicing entity (which may also be an enterprise, such as a financial institution) to request, or begin enrollment for, a verification and validation dashboard.

As used herein, a dashboard includes an access portal with a user interface that may be accessible via the internet or other network, such as via a web browser, mobile device application, or other network application. The dashboard is able to provide information to users via any audiovisual means deemed suitable, including text, alphanumeric codes, images, video and/or audio recordings, document views and downloads, text messages, telephone calls, etc. The dashboard may also be able to accept information from users via any means deemed suitable, such as through fillable forms that include query fields (which may be text boxes, password fields, radio buttons, check boxes, selectable pull-down lists, or other field types), images and/or other audiovisual recordings, document uploads, scans (such as biometric scans, document scans, etc.), phone calls, etc. Information may be provided or accepted by the servicing entity directly (e.g., via a webpage that is accessible via the user interface), or indirectly (e.g., via mobile or non-mobile devices and systems, such as smartphones, tablets, other devices enabled with global positioning system (GPS) capabilities, e-mails, etc.). In certain versions, the dashboard includes a user interface accessible via a network (such as the internet) using a network application (such as a web browser or mobile device application). The dashboard may in some implementations include one or more webpages (which may be navigated to via various links) with fillable forms that provide a set of query fields that may accept information via, for example, user input and/or automated population by a computing system.

In various embodiments, the enterprise currently has, or had in the past, a relationship with the servicing entity. In the case of a servicing entity that is a financial institution, for example, the enterprise may have a bank account, credit card, investments, or loans with the financial institution. By virtue of such a relationship, the servicing entity has certain information about the enterprise, such as the date the enterprise was established or began operating, the number of employees, the identities of its managers, physical locations, the enterprise's assets, how much debt the enterprise carries, etc. The servicing entity would have an incentive to maintain such information, and for the information to be accurate and up-to-date, because of the relationship between the enterprise and the servicing entity. For example, in the example in which the servicing entity is a financial institution that has issued a credit card or a loan that may involve collateral, the financial institution would require certain information about the enterprise to better manage risks and losses in case of default by the enterprise.

Once enrolled/registered, the servicing entity system 102 may generate or otherwise provide one or more dashboards (via 208, 212, 216) that allows clients of the enterprise to access, verify, track, and validate information on the enterprise and/or its representatives. The dashboard may vary in format and content based on, for example, commercial characteristics of the enterprise, such as the type of business (e.g., what goods and/or services are offered and in which markets), the industry in which the enterprise operates (e.g., aerospace and defense, automotive and transportation, industrial manufacturing, consumer products, information technology, energy, life sciences, food and beverage, etc.), characteristics of its client base, the level of interaction between clients and representatives of the enterprise, and/or the selections of the enterprise.

In generating a dashboard, the servicing entity system 102 may begin with a dashboard template, which may be a "shell" or framework for a dashboard (with fields that are empty and/or fields that can include information which may or may not be modifiable), before the dashboard becomes searchable and/or available to clients. The dashboard template may be useful for directing the acquisition and selection of data from various databases and from the enterprise, but its content and format may be in flux (i.e., subject to change or not finalized) or otherwise in a "pre-production" state (i.e., before it goes live or otherwise becomes available via a network to its intended audience, such as a (prospective or current) customer, a (prospective or current) investor, or other client of the enterprise). For example, the database template may be used to determine and/or identify what information is to presented to one or more clients of the enterprise and what information is to be kept confidential from some or all clients. It is noted that after a dashboard template or dashboard is generated, the dashboard template and/or dashboard may be modified based on, for example, additional data that becomes available, client preferences, etc.

One option for determining the dashboard template to start with is to present a set of available dashboard template options and, at 208, have the enterprise select one or more dashboard templates. In other implementations, at 212, a dashboard template may be automatically selected by the servicing entity system 102 based on input from the enterprise. The input received from the enterprise may be a response (such as an alphanumeric entry or a selection) to a query presented by the system. The input may, for example, indicate the type of business or its industry. Example inputs include an enterprise's Employer Identification Number (EIN) or North American Industry Classification System (NAICS) code.

In other embodiments, at 216, the dashboard template may be automatically selected based on information gathered and/or provided to the servicing entity system 102. For example, the information may be available to the servicing entity system 102 because of past dealings between the enterprise and the servicing entity, in which case, the servicing entity system 102 may gather the information by retrieving it from other databases/systems of the servicing entity. Alternatively or additionally, the information can be gathered from one or more computing devices of representatives of the enterprise. For example, the gathering may occur by allowing the servicing entity system 102 to remotely access one or more databases of a computing device of the enterprise. The information may also be gathered via third-party computing systems (such as third-party computing systems 110, which may be accessible via the internet or other networks via network connection 160, as shown in FIG. 1). The servicing entity may make predictions for the type of information that can be entered into the dashboard template, or provided via the dashboard, based on information available to the servicing entity; the information may have been acquired before the request/enrollment in the dashboard system (204), or thereafter.

In other implementations, the information may be gathered by the servicing entity by installing/running software on one or more computing devices used by one or more representatives of the enterprise. For example, the software may be installed on one or more machines of suitable personnel of the enterprise to observe and/or collect business or other data. The data can be found by observing the content in such sources as documents, e-mails, keyboard entries, web searches, etc. By accessing marketing materials, for example, the software may gather information that can explicitly or implicitly identify the nature of the business or its industry. Commercial characteristics and other information may also be inferred from gathered data. The software may make an inference, for example, about the nature of a business by observing what information is received and transmitted by representatives' machines. Discussions and exchange of documents or other data containing, for example, part numbers for inventory in a warehouse may suggest the enterprise could be a wholesale or retail supplier of goods; data on groceries and freshness of produce from farmers or other suppliers may suggest the enterprise could be a grocery store or restaurant; schematics for products and buildings may suggest the enterprise could be an engineering or architectural firm; etc. Similarly, the servicing entity's software may be installed on machines of the enterprise to observe what applications are run on the machines of the enterprise (e.g., inventory management software, CAD software, etc.) and/or communications with clients to better understand the nature of the business. The software may provide gathered data to the servicing entity system via, for example, a network connection, such as network connection 150 or network connection 156. It is noted that, in certain implementations, the confidentiality of more sensitive information may be maintained by having the software not provide the data itself but instead metadata or results of an analysis of the data (such as characterizations and generalizations based on observations).

In an operation 220, fields in the dashboard template may be populated with information previously available to the servicing entity as a result of the servicing entity's dealings with the enterprise. Alternatively or additionally, fields may be populated with information gathered via, for example, software installed on one or more machines of the enterprise.

In an operation 228, the enterprise may impose restrictions on availability of information. For example, the enterprise may identify certain information as being confidential or otherwise not to be made available to clients. For some or all of the information in the dashboard template, the enterprise may restrict access to certain clients, to certain times, and/or according to other preconditions. The clients granted or denied access may be identified individually (for example, by specific e-mail addresses) or as a group (e.g., having an e-mail of identified domains, such as "name_of_the_business.com" or the like). In other implementations, the enterprise may instruct the servicing entity system 102 to ask clients for a code (e.g., a code provided by the enterprise to authorized users) in order to be granted access. At 232, the enterprise may provide additional information on the enterprise or its representatives to be made available to clients. Depending on the implementation, the enterprise may impose restriction on availability of information at any point during method 200.

One approach to applying restrictions is to place information in "buckets" or categorizations, such as "public," "internal use only," "for review," etc. Information may be placed in preliminary classifications by the servicing entity system based on, for example, industry norms and trends, internal information (such as the behavior of similar enterprises with respect to their dashboards), information in third-party databases, etc. The preliminary classifications could serve as recommendations or proposed treatments for certain data. The enterprise could then review the preliminary classifications and accept or revise the classifications as deemed appropriate.

It is noted that the dashboard can include, for available information, an indication that certain information has been verified or is otherwise relatively more reliable than other information. For example, information previously known to the servicing entity, or obtained from a third-party source and confirmed, corroborated by data from other sources, or otherwise scrutinized or reviewed by the enterprise, may be afforded a greater reliability rating or score than the unscrutinized additional (supplementary) information supplied by the enterprise for the dashboard. If a scoring system is used, a lower confidence score may be afforded to information from the enterprise, whereas a higher score may be afforded to data that was previously provided to the servicing entity as part of a preexisting business relationship. Providing such a reliability rating or score via the dashboard can help clients determine the level of confidence they have in certain information, and evaluate whether certain key information should can be accepted as reliable or should be separately verified/confirmed by the client.

At 236, the dashboard may be generated and made available to clients. This may involve, for example, removing fields that remain empty (i.e., were not populated by the servicing entity or the enterprise) and adding code in preparation for making it searchable and/or accessible via the network application. The enterprise or servicing entity may provide a link to select clients (e.g., via e-mail) to direct the clients to the dashboard. Access may require involve a request for credentials, biometrics, or other login/authentication data (such as a code generated by the servicing entity to be used by one, some, or all clients to access the dashboard or restricted portions thereof). In some versions, making the dashboard available may involve making the dashboard searchable via an access portal of the servicing entity, and/or discoverable to a search engine (such as, e.g., Google, or a specific search engine of the servicing entity). Once found, the client may be granted access to some or all of the information in the dashboard. If all of the information is restricted, then the search engine may reveal that a dashboard exists without providing access to the information of the dashboard, optionally providing instructions on what must be done to be granted access.

The information to be made available via the dashboard may change, and the servicing entity system 102 may become aware of the changes, for example, by accessing information that becomes available to the servicing entity as a result of the dealings between the enterprise and the servicing entity. The servicing entity system 102 may also become aware of such changes using software that gathers information via one or more computing devices of the enterprise. The software may be the same software that gathered information for selection of a dashboard template, or it may be different/newly installed software. Information may also change, for example, as a result of information being retrieved from or submitted by (manually or in an automated fashion) the enterprise, a client, or a third party.

It is noted that not all of the steps shown in FIG. 2 need to be performed in all cases and need not necessarily be performed in the specific sequence depicted in FIG. 2. For example, once the dashboard template is populated at 220, the dashboard may become available without the enterprise restricting access to certain information (at 228) and/or without the enterprise adding additional information (at 232). Similarly, once the dashboard template is populated at 220, and before the dashboard is generated and made available to clients (at 236), the dashboard template may be updated at 240 based on new information that becomes available to the servicing entity system 102. In other implementations, after the enterprise restricts information (at 228), and before the dashboard is generated and made available (at 236), the dashboard template may be updated at 240. Steps may be removed, added, and/or reordered by the servicing entity as deemed appropriate.

As suggested above, new information for selecting and/or generating the dashboard or dashboard template (or for making suggestions to the enterprise) may become available as a result of the relationship between the enterprise and the servicing entity (e.g., via the financial services provided by a servicing entity that is a financial institution), or it may be acquired via third-party computing systems. For example, machine learning algorithms may be used to determine standards and trends in the industry by reviewing information on the internet (e.g., reviewing internet websites to identify the types of information that are frequently discussed in news articles, press releases, business forums, trade association posts, blogs, etc.). The servicing entity may also provide suggestions to the enterprise based on the selections of enterprises with comparable dashboards. Dashboards and dashboard templates may be revised automatically to, for example, add fields (e.g., to accommodate information that is commonly provided by other enterprises as supplemental information to be included in the dashboard) and/or remove fields (e.g., if few or no enterprises in the same industry choose to include the corresponding information in their dashboards). Similarly, if other enterprises in the industry make certain information available via their dashboards, or make certain information confidential, then the servicing entity system may modify the preliminary classifications for information in dashboard templates in order to be more in line with norms for certain enterprises. Dashboards and dashboard templates may be revised automatically by the servicing entity computing system, or following inputs by the servicing entity or enterprise, for example.

An example dashboard for an enterprise may include, depending on the nature of the enterprise and the needs of its clients, and without limitation, such information as: date established; number of years in continuous operation; software usage; SharePoint experience; identification numbers, classifications, roles, education, and/or experience of representatives (employees, contractors, managers, executive leaders, board members, etc.); reviews of employees (such as reviews of service providers by clients); employee turnover; funding secured; process automation; compliance systems and metrics; type of manufacturing (e.g., light or heavy); supply chain expertise; automation; error rates and remediation; intellectual property assets (e.g., patents owned and trademarks used); hours open; whether credit cards or checks are accepted; etc.

Figure 3:
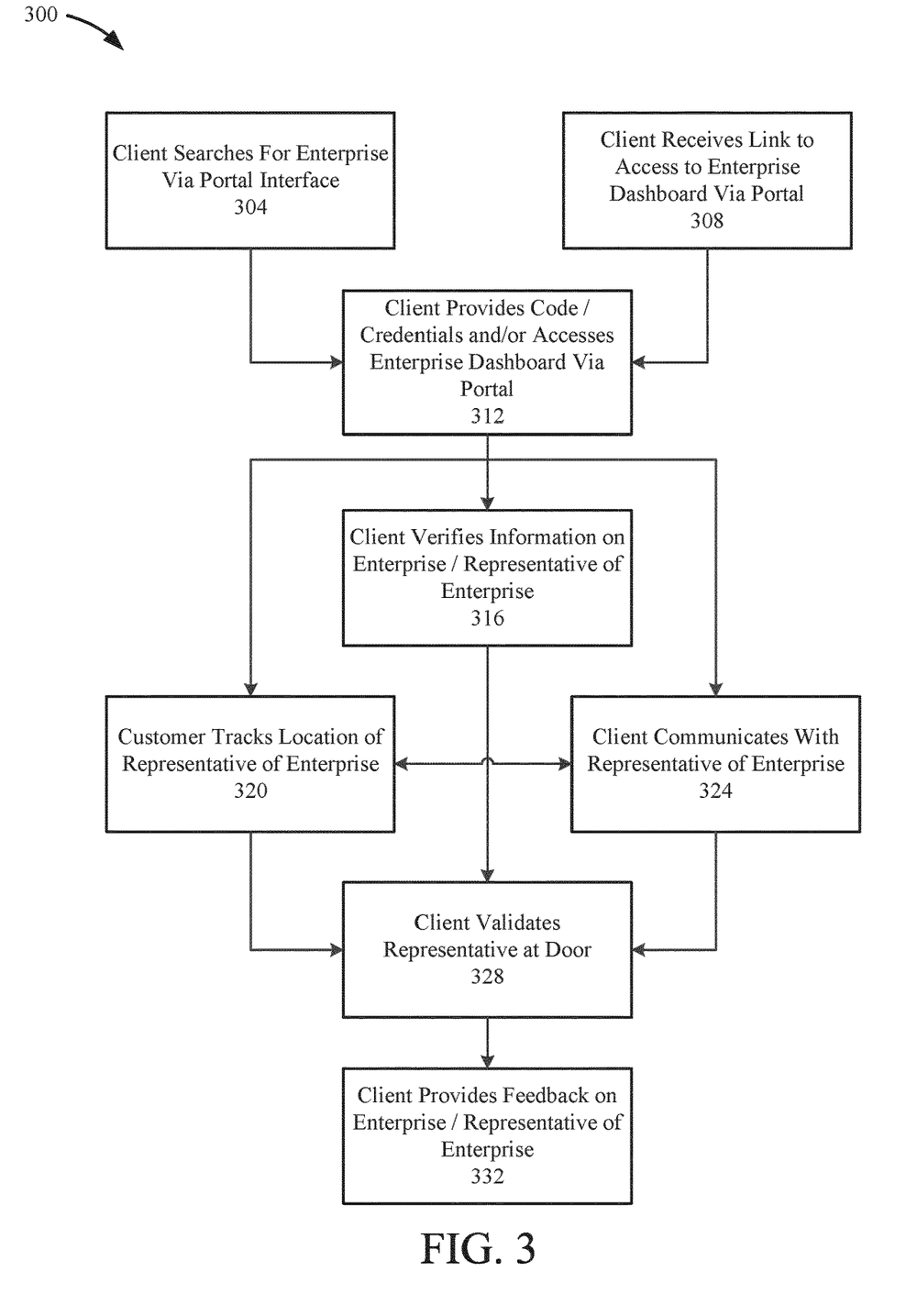
FIG. 3 is a flow diagram of an example verification, tracking, and validation method according to one or more embodiments.

Referring to FIG. 3, to access the dashboard, a client may, at 304, search for the enterprise via a portal interface provided by the servicing entity system 102. Alternatively, at 308, the client may be provided with a link (e.g., via an e-mail from the servicing entity system 102 to a client's e-mail address) for accessing the dashboard. To access the information in the dashboard, the servicing entity system 102 may require the client to enter a code or login credentials; such codes and credentials may be provided by, for example, the enterprise or the servicing entity to enforce the restrictions imposed by the enterprise or servicing entity (to protect confidential and private information by only allowing access to select data and only to authorized entities). At 316, the client is able to verify information on the enterprise and/or a representative of the enterprise using the dashboard.

In various implementations, the dashboard may allow the client, at 320, to track the location of a representative of the enterprise. The representative's whereabouts may be determined based on, for example, the mobile phone or other GPS-enabled device that is in the representative's vehicle and/or that is carried by the representative. The servicing entity system 102 may be provided access to the location of the representative as determined using the GPS-enabled device for making available via the dashboard. In some implementations, location information may be pushed to the servicing entity system 102, or requested by the servicing entity system 102, at certain intervals (e.g., once a minute or every 5 minutes) during a specified time (e.g., during the window of time given by the enterprise for when a service provider may arrive at the client's location, and/or while the representative is in transit).

As an illustrative example, the enterprise may be a provider of extermination services, and the client may have arranged for extermination services with the enterprise. The client may be provided, either via the dashboard or otherwise, with a window of time during which to expect the exterminator. On the day of the service, the client may wish to have more specific information about when the extermination service provider should be expected to arrive at the client's location. The enterprise may have specified (e.g., at 228 in FIG. 2) that information on the service provider's whereabouts) is to be available to this client during a specified time (e.g., on the date of service, or during a window of time, such as the window of time during which the service provider is expected to arrive at the client's residence or workplace). Using the dashboard, the client may be provided access to information on the service provider's location (which may be provided by the dashboard by providing an address, coordinates, a map with the representative's location represented by an icon, an estimated time of arrival, distance away from the client's location, etc.).

Alternatively or additionally, at 324, the client and representative may be able to communicate via the dashboard. For example, the client may wish to send a message to the representative to let him or her know to use a side door or to avoid ringing the doorbell because a baby is sleeping. Similarly, the representative may wish to communicate with the client to inform the client that he or she will be delayed, or that he or she has started heading to the client's location.

In some implementations, the client would like to validate that a person arriving at the client's location (residence, workplace, etc.) is an authorized representative of the enterprise and/or is the representative scheduled to provide a service. For example, the client may wish to validate that the person walking up to the door, or knocking on the door/ringing the doorbell, is the representative (exterminator, plumber, etc.) of the enterprise as expected. This may be done, for example, by having the mobile device of the representative transmit a message to the servicing entity (directly or via the enterprise) once the representative has arrived. The message, which may include the representative's whereabouts and a time stamp, can confirm for the servicing entity, and for the client via the dashboard, that the representative has arrived where he or she was expected. The client may gain confidence, based on the timing or content of the messages, that the person at the door is the representative of the enterprise. Additionally or alternatively, the dashboard may include a photograph of the representative to help verify the expected representative's identity. The photograph may be a stock photograph taken in the past, or a current "selfie" (i.e., a self-portrait captured using, for example, the service provider's mobile device) taken upon arrival to show the client the representative's current appearance (for example, clothes, hair, etc.).

In other implementations, the servicing entity system 102 may generate a code (such as a term, phrase, or alphanumeric sequence) and provide that code only to the client and the representative, and when the representative provides the code to the client, the client gains confidence that the person at the door is from the enterprise. Similarly, the servicing entity system 102 may provide the client and the representative with digital tokens (which may only function within a specific time frame and only one time), allowing a client device and a representative device to perform a digital "handshake" to verify the identity of the representative. The representative may also be provided with an access code for entry into the client's residence or another restricted area. For example, a security system of the client may have a keypad, and the representative may be provided with the access code for entry in case the client is not present. The representative may also be provided with a digital key that allows a mobile device of the representative to communicate with a security system of the client as authentication for gaining entry. The security system may be programmed to accept the access code and/or the digital key only once and/or only within a specified time window during which the representative is expected. It is noted that the representative may be validated using any hardware or software means known now or developed in the future.

It is also noted that the representative tracking and validation system can be implemented separately from other components of the system, and need not necessarily require generation of a dashboard that includes information from the servicing entity system (in populated fields) and/or additional (supplementary) information provided by the enterprise.

At 332, the dashboard may provide an opportunity for the client to provide a review or other feedback about the service received, to confirm that the representative has completed the job and left the location, that the job was completed satisfactorily or was not completed because a part is needed, etc. The review system may be tailored to allow the client to review different facets of the service provided, such as promptness, efficiency, quality of work, friendliness, knowledgeability, etc. Such reviews would be more granular than an overall rating (such as number of stars based on a five-star rating scale) for a representative or service. Such overall ratings are based on a sort of mental averaging of the factors considered relevant by the particular reviewer, with different factors given different weights by different reviewers depending on what is more or less significant to that reviewer. Because another client may assign different weights to factors deemed relevant, a more granular review allows the client to perform his or her own evaluation and can be more informative.

In some implementations, if only textual remarks are provided by a client, the text can be analyzed to determine what was satisfactory/unsatisfactory, and ratings for the representative adjusted accordingly. For example, if the remarks state that the representative was late (using any terminology/phrasing deemed to indicate that the representative did not arrive promptly/as scheduled), while stating that the work performed was acceptable (or otherwise not commenting on the quality of the work), the representative may receive a lower promptness rating for the job, but the representative may receive a neutral, positive, or no review for quality of work. If other clients value quality of work above promptness, they may give more weight to the quality ratings and deemphasize the promptness ratings. This allows text-only feedback to be converted to a more granular rating system that evaluates different facets of a representative's service.

It is noted that such reviews could be made accessible for use by the enterprise as well as other clients scheduled to receive service from the representative. The enterprise may use location data and feedback received via the servicing entity system 102 to better account for representative's time, efficiency, competence, rapport with clients, etc. The enterprise may track the progress/efficiency/performance of representatives, and send messages to representatives midday with course corrections, suggestions, or praise based on the tracking and review system.

The above-described systems and methods provide for an intelligent dashboard that is custom-tailored to the needs of enterprises and their clients. The type of information that is valuable to clients may be predicted using information from third parties, or from the enterprise or its representatives (obtained, e.g., via input by representatives or via software installed on computing devices of the representatives). Dashboard templates (with fields presented to enterprises during set up) and dashboards (with information provided to clients once the dashboard is made available) may be modified as more information is learned about the industry and trends therein, consumer behaviors, and selections of others in similar industries who have dashboards, so that clients continue to receive the most relevant, current, and useful information. The dashboard may include information from the servicing entity as well as the enterprise, and the enterprise may select what information is to remain confidential from all or some clients. Representatives of the enterprise may also be tracked and validated when arriving at a client's location. Reviews of clients may be intelligently parsed to provide the client with the information deemed most useful by particular clients. The dashboard provides clients and enterprises with more reliable, relevant, and actionable information.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computer-implemented method comprising:

acquiring, by a financial institution computing system of a financial institution and from an enterprise computing system of an enterprise with a financial account at the financial institution, via a first network connection between the enterprise computing system and the financial institution computing system, a first dataset for the financial account, the first dataset including information about the enterprise;

receiving, by the financial institution computing system from the enterprise computing system, via the first network connection, after acquiring the first dataset from the enterprise computing system, a request of the enterprise to enroll in a dashboard service of the financial institution;

generating, by the financial institution computing system, a dashboard template with a set of fields corresponding to the information about the enterprise, the set of fields automatically selected by the financial institution computing system based on the information about the enterprise in the first dataset;

populating, by the financial institution computing system, a first subset of fields in the set of fields using data in the first dataset and a second subset of fields in the set of fields using data retrieved from an internal or external database;

accepting, by the financial institution computing system and from the enterprise computing system, via the first network connection, a set of user selections identifying which of the automatically selected set of fields in the first and second subsets are to be made available to which clients of the enterprise;

acquiring, by the financial institution computing system, at predetermined intervals, from a GPS-enabled computing device of a representative of the enterprise, location information corresponding to a detected location of the GPS-enabled computing device;

generating, by the financial institution computing system, a dashboard comprising a user interface with the automatically selected set of fields identified by the set of user selections as populated with data from the first dataset and a map having an icon representing and tracking the detected location of the GPS-enabled computing device;

providing, by the financial institution computing system via a second network connection, the generated dashboard in a website or mobile application running on a client computing device of a client of the enterprise, wherein the generated dashboard includes the icon and the user selected set of fields, and wherein the icon tracks the GPS-enabled computing device based on the location information acquired at the predetermined intervals as the GPS-enabled computing device changes location;

determining, by the financial institution computing system, that the location information indicates that the GPS-enabled computing device is near a predetermined location of the client computing device;

generating, by the financial institution computing system, a digital token for authenticating the GPS-enabled computing device with the client computing device;

transmitting, by the financial institution computing system, the digital token to the GPS-enabled computing device and the client computing device to enable the client computing device to verify the GPS-enabled computing device by determining that the digital token received from the GPS-enabled computing device corresponds to the digital token received from the financial institution computing system;

providing, by the financial institution computing system, an indication in the generated dashboard that the GPS-enabled computing device associated with the icon is near the predetermined location of the client computing device;

generating, by the financial institution computing system, in the dashboard template, one or more classifications for whether the automatically selected set of fields are to be made accessible or inaccessible to a first client device and a second client device via the dashboard based on whether another enterprise in a same industry as the enterprise made the automatically selected set of fields accessible or inaccessible; and accepting, by the financial institution computing system and from the enterprise computing system, via the first network connection, the set of user selections identifying which of the classified automatically selected set of fields are to be made available to which clients of the enterprise.

2. The method of claim 1, further comprising, after providing the generated dashboard to the client computing device, automatically updating, by the financial institution computing system, the automatically selected set of fields in the dashboard using data received by the financial institution computing system from the enterprise computing system of the enterprise.

3. The method of claim 1, wherein the client is a first client and the client computing device is a first client computing device, and wherein the method further comprises, after providing the generated dashboard to the first client:

automatically updating, by the financial institution computing system, the user selected set of fields in the dashboard using data acquired by the financial institution computing system from one or both of:
the first client via the first client computing device; and
a second client via a second client computing device; and
providing, by the financial institution computing system, an updated dashboard to at least one of the first client computing device and the second client computing device.

4. The method of claim 1, wherein the client is a first client and the client computing device is a first client computing device, wherein at least one field in the set of fields includes information about the representative of the enterprise, and wherein the method further comprises, after providing the generated dashboard to the first client computing device:

receiving, by the financial institution computing system, and from the first client computing device, feedback on the representative;
automatically updating the dashboard to include information about the representative acquired from the feedback; and
providing, by the financial institution computing system, and to a second client computing device of a second client of the enterprise, an updated dashboard with the information about the representative.

5. The method of claim 4, wherein the updated dashboard identifies characteristics corresponding with the feedback.

6. The method of claim 1, the method further comprising:
acquiring, by the financial institution computing system, and from the enterprise computing system, a second dataset with data that is not contained in the first dataset; and
populating, by the financial institution computing system, one or more fields in the set of fields using data in the second dataset, wherein the generated dashboard includes the automatically selected set of fields as populated using data in both the first and second datasets.

7. The method of claim 1, further comprising, by the financial institution computing system:
generating an access code for one or more selected client computing devices to use to access the dashboard; and
providing the access code to the enterprise computing system.

8. The method of claim 1, wherein the dashboard includes information about the representative of the enterprise, and wherein the method further comprises, by the financial institution computing system:
generating an access code for validation of the representative; and
providing the access code to both: i) the client computing device via the dashboard; and ii) the representative via at least one of the enterprise computing system and the GPS-enabled computing device of the representative.

9. The method of claim 1, further comprising providing, by the financial institution computing system, the representative with an access code or digital key for gaining access to a residence or workplace.

10. The method of claim 1, wherein the first dataset is obtained by the financial institution computing system for maintaining the financial account of the enterprise before the request to enroll in the dashboard service is received by the financial institution computing system.

11. The method of claim 1, wherein the first dataset acquired by the financial institution computing system is acquired via software of the financial institution installed on one or more computing devices of one or more representatives of the enterprise.

12. A financial institution computing system of a financial institution, the financial institution computing system comprising:
 a processor;
 a network interface, wherein the financial institution computing system is communicatively coupled, via the network interface, with an enterprise computing system of an enterprise that has a financial account at the financial institution, a first client computing device of a first client of the enterprise, and a second client computing device of a second client of the enterprise;
 a memory having instructions that, when executed by the processor, are configured to direct the financial institution computing system to:
  acquire, from the enterprise computing system of the enterprise, via a first network connection using the network interface between the enterprise computing system and the financial institution computing system, a first dataset for opening or administering the financial account, the first dataset including information about the enterprise;
  receive, from the enterprise computing system via the first network connection, after acquiring the first dataset from the enterprise computing system, a request of the enterprise to enroll in a dashboard service of the financial institution;
  use information in the first dataset to automatically select a set of fields corresponding to the information about the enterprise, and generate a dashboard template with the automatically selected set of fields;
  populate the automatically selected set of fields with data from the first dataset;
  accept, from the enterprise computing system, via the first network connection, a set of user selections identifying which of the automatically selected set of fields are to be made available to which clients of the enterprise, wherein the set of user selections identifies a first subset of fields to be made available to the first client computing device and a second subset of fields to be made available to the second client computing device;
  acquire, at predetermined intervals, from a GPS-enabled computing device of a representative of the enterprise, location information corresponding to a detected location of the GPS-enabled computing device;
  generate a first dashboard with the first subset of fields and populate the first subset of fields with data from the first dataset, the first dashboard having a map having an icon representing the detected location of the GPS-enabled computing device;
  provide in a website or mobile application, to the first client computing device, via a second network connection using the network interface, the generated first dashboard with the icon and the first subset of fields selected by the enterprise to be available to the first client computing device, and wherein the icon tracks the GPS-enabled computing device based on the location information acquired at the predetermined intervals as the GPS-enabled computing device changes location;
  generate a second dashboard with the second subset of fields and populate the second subset of fields with data from the first dataset;
  provide, to the second client computing device, via a third network connection using the network interface, the generated second dashboard with the second subset of fields selected by the enterprise to be available to the second client computing device;
  determine that the location information indicates that the GPS-enabled computing device is near a predetermined location of the first client computing device;
  generate a digital token for authenticating the GPS-enabled computing device with the first client computing device;
  transmit the digital token to the GPS-enabled computing device and the first client computing device to enable the first client computing device to verify the GPS-enabled computing device by determining that the digital token received from the GPS-enabled computing device corresponds to the digital token received from the financial institution computing system;
  provide an indication in the generated first dashboard that the GPS-enabled computing device associated with the icon is near the predetermined location of the first client computing device;
  generate, in the dashboard template, one or more classifications for whether the automatically selected set of fields are to be made accessible or inaccessible to a first client device and a second client device via the dashboard based on whether another enterprise in a same industry as the enterprise made the automatically selected set of fields accessible or inaccessible; and
  accept, from the enterprise computing system, via the first network connection, the set of user selections identifying which of the classified automatically selected set of fields are to be made available to which clients of the enterprise.

13. The financial institution computing system of claim 12, wherein the financial institution computing system is further configured to:
 acquire, from the enterprise computing system, a second dataset with data that is not contained in the first dataset; and
 populate one or more fields in the first and second dashboards with data from the second dataset such that the generated first and second dashboards include data from both the first and second datasets.

14. The financial institution computing system of claim 12, wherein the first dashboard includes information about one or more representatives of the enterprise, and wherein the financial institution computing system is further configured to:
 generate an access code for validation of the representative; and
 provide the access code to both: i) the first and second client computing devices via the first and second dashboards, respectively; and ii) the representative via at least one of the enterprise computing system and a representative computing device.

15. A method implemented by a financial institution computing system of a financial institution that holds a financial account of an enterprise, the method comprising:
 acquiring, by the financial institution computing system, from an enterprise computing system of the enterprise, via a first network connection between the enterprise computing system and the financial institution computing system, a first dataset for the financial account of the enterprise, the first dataset including commercial characteristics of the enterprise;

receiving, by the financial institution computing system, via the first network connection, a request to enroll the enterprise in a dashboard service of the financial institution, and enrolling the enterprise in the dashboard service;

based on the commercial characteristics of the enterprise, automatically selecting, by the financial institution computing system, a set of fields corresponding to information about the enterprise;

generating, by the financial institution computing system, a dashboard template with the automatically selected set of fields corresponding to the information about the enterprise, wherein the data in the first dataset were acquired by the financial institution for the financial account before the request to enroll in the dashboard service was received by the financial institution computing system;

acquiring, by the financial institution computing system, a second dataset with data that is not contained in the first dataset;

populating, by the financial institution computing system, fields in the automatically selected set of fields using data in both the first dataset and the second dataset;

accepting, by the financial institution computing system, via the first network connection, a set of user selections identifying which fields in the automatically selected set of fields are to be made available to which clients of the enterprise;

acquiring, by the financial institution computing system, at predetermined intervals from a GPS-enabled computing device of a representative of the enterprise, location information corresponding to a detected location of the GPS-enabled computing device;

generating, by the financial institution computing system, a dashboard with the automatically selected set of fields identified by the set of user selections as populated using data in both the first dataset and the second dataset, the dashboard having a map having an icon representing the detected location of the GPS-enabled computing device;

providing in a website or mobile application, by the financial institution computing system, via a second network connection, the generated dashboard to a client computing device of a client of the enterprise;

automatically updating, by the financial institution computing system, the automatically selected set of fields identified by the set of user selections in the dashboard using data subsequently received by the financial institution computing system from at least one of the enterprise computing system or the client computing device;

automatically updating, by the financial institution computing system, the icon using the location information acquired at the predetermined intervals, wherein the icon tracks the GPS-enabled computing device based on the location information as the GPS-enabled computing device changes location;

providing in the website or the mobile application, by the financial institution computing system, to the client computing device via the second network connection, an updated dashboard with the icon and the automatically selected set of fields identified by the set of user selections updated with the data subsequently received by the financial institution computing system;

determining, by the financial institution computing system, that the location information indicates that the GPS-enabled computing device is near a predetermined location of the client computing device;

generating, by the financial institution computing system, a digital token for authenticating the GPS-enabled computing device with the client computing device;

transmitting, by the financial institution computing system, the digital token to the GPS-enabled computing device and the client computing device to enable the client computing device to verify the GPS-enabled computing device by determining that the digital token received from the GPS-enabled computing device corresponds to the digital token received from the financial institution computing system;

providing, by the financial institution computing system, an indication in the generated dashboard that the GPS-enabled computing device associated with the icon is near the predetermined location of the client computing device;

generating, in the dashboard template, one or more classifications for whether the automatically selected set of fields are to be made accessible or inaccessible to a first client device and a second client device via the dashboard based on whether another enterprise in a same industry as the enterprise made the automatically selected set of fields accessible or inaccessible; and accepting, from the enterprise computing system, via the first network connection, the set of user selections identifying which of the classified automatically selected set of fields are to be made available to which clients of the enterprise.

16. The method of claim 15, further comprising:
generating, by the financial institution computing system, an access code for one or more selected clients to use to access the dashboard; and
providing, by the financial institution computing system, the access code to the enterprise computing system.

17. The method of claim 15, further comprising providing, via a third network connection, software to one or more representative computing devices of one or more representatives of the enterprise for installation on the one or more representative computing devices, wherein data in at least one of the first and second datasets is acquired by the financial institution computing system via the software.

18. The method of claim 1, further comprising:
generating, by the financial institution computing system, and based on the set of user selections, a login credential granting the client computing device of the client of the enterprise access to the automatically selected set of fields identified by the set of user selections;
transmitting, by the financial institution computing system, the login credential to the client computing device of the client;
serving a portal interface, by the financial institution computing system through the website or the mobile application, to enable input of the login credential for access to the automatically selected set of fields identified by the set of user selections; and
receiving, through the portal interface by the financial institution computing system via the second network connection between the client computing device and the financial institution computing system, the login credential from the client computing device.

19. The financial institution computing system of claim 12, wherein the financial institution computing system is further configured to:

generate, based on the set of user selections, a login credential granting the first client computing device access to the first subset of fields;

transmit the login credential to the first client computing device;

serve a portal interface to enable input of the login credential for access to the automatically selected set of fields identified by the set of user selections; and receive, through the portal interface via the second network connection between the first client computing device and the financial institution computing system, the login credential from the first client computing device.

\* \* \* \* \*